S. SZUCS.
AGRICULTURAL IMPLEMENT.
APPLICATION FILED OCT. 5, 1920.
1,391,023.
Patented Sept. 20, 1921.
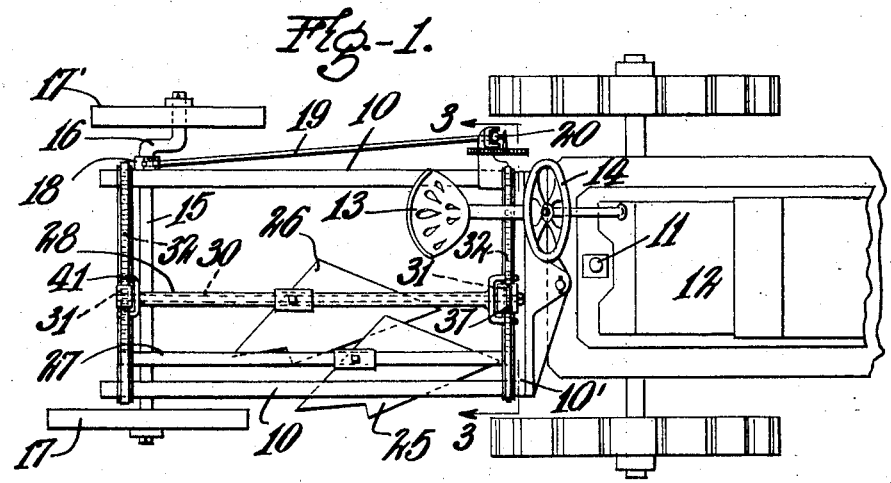
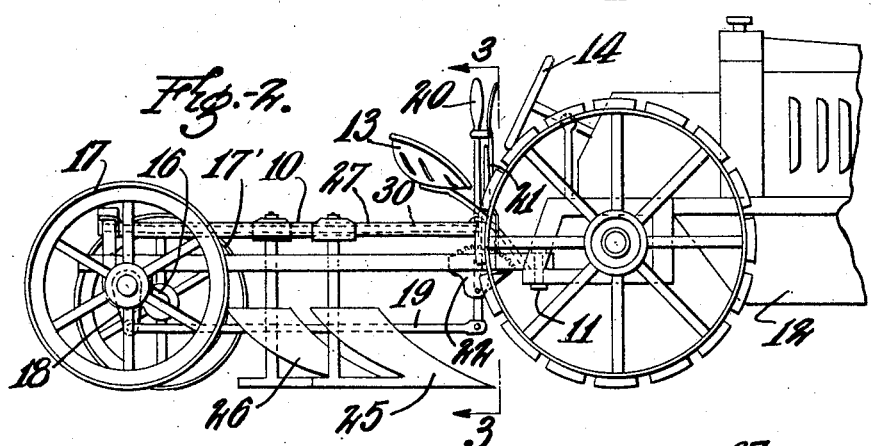
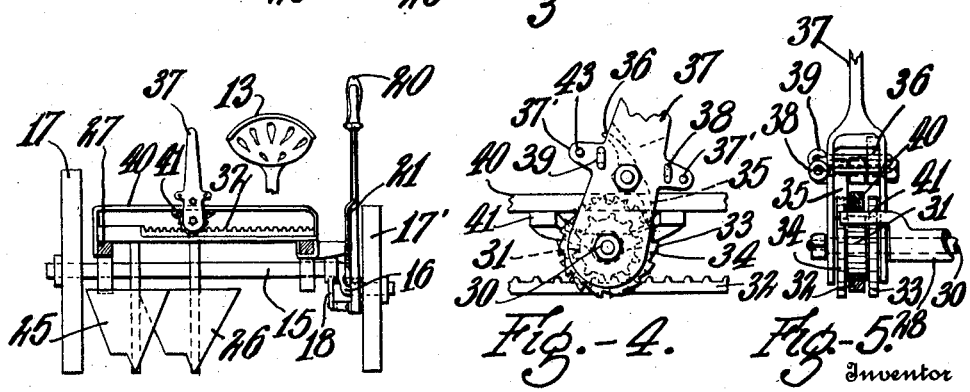
Inventor
Stephen Szücs

UNITED STATES PATENT OFFICE.

STEPHEN SZUCS, OF HOMESTEAD, PENNSYLVANIA, ASSIGNOR OF ONE-THIRD TO ANDREW DUDAS, OF HOMESTEAD, PENNSYLVANIA.

AGRICULTURAL IMPLEMENT.

1,391,023.     Specification of Letters Patent.     Patented Sept. 20, 1921.

Application filed October 5, 1920. Serial No. 414,847.

*To all whom it may concern:*

Be it known that I, STEPHEN SZUCS, citizen of the United States, residing at Homestead, in the county of Allegheny and State of Pennsylvania, have invented certain new and useful Improvements in Agricultural Implements, of which the following is a specification.

This invention relates to an agricultural implement and it has for an object to provide an improved gang plow in which two plows may be spaced from one another as may be desired.

For further comprehension of the invention, and of the objects and advantages thereof, reference will be had to the following description and accompanying drawings, and to the appended claims in which the various novel features of the invention are more particularly set forth.

Figure 1 of the drawings is a plan view of an agricultural implement constructed according to the invention.

Fig. 2 is a side view of the implement.

Fig. 3 is a transverse section on the line 3—3 of Figs. 1 and 2.

Fig. 4 is a detail elevation of the device for shifting the adjustable plow.

Fig. 5 is an elevation of the same device taken at right angles to Fig. 4.

As here embodied my improved agricultural implement comprises a double plow, a rectangular frame 10 the forward crossbar 10' of which is adapted to be connected as at 11 to the traction means, in the present instance a motor tractor 12, the frame of which supports a rearwardly projecting seat 13, the steering wheel of the tractor being indicated at 14. The front end of the plow frame 10 is supported by the tractor 12 as is apparent.

The rear end of the frame 10 has suitably journaled thereunder an axle 15 one end of which has rotatably mounted thereon a running wheel 17, and the other end of which is cranked as at 16 and has rotatably mounted thereon a running wheel 17'. Fixed on the axle 15 is an arm 18 whose lower end has connected thereto the rear end of a link 19, the front end of this link connecting to a lever 20 suitably fulcrumed adjacent the seat 13 and provided with the usual locking bar 21 engaging a notched segment 22. By this means the plows can be raised or lowered.

The plows are indicated at 25, 26 and in their detail construction may be of the usual type. These plows are rigidly fixed by suitable means on a pair of bars 27, 28 extending longitudinally of the frame 10, the bar 27 being fixed, and the plow 25 carried thereby being correspondingly fixed in position. The bar 28 however is adapted to be adjusted transversely of the frame 10 to space the two plows laterally from one another as may be desired.

To this end the bar 28 is longitudinally cored to freely surround a shaft 30 which extends therethrough and has fixed on opposite ends thereof a pair of gear pinions 31 which roll on racks 32 supported by the transverse members of the frame 10. Fixed on the forward end of shaft 30 are a pair of oppositely facing ratchet wheels 33 and 34 which are adapted to be engaged respectively by pawls 35 and 36 on a lever 37 freely fulcrumed on the end of shaft 30. A pair of removable pins 38 and 39 are carried by the lever 37 and are adapted to engage under either one of the pawls as desired to hold the same out of engagement with its ratchet wheel. Extending along over the end members of the frame 10 are a pair of guide straps 40, while the bar 28 has at each end a pair of laterally extending lugs such as 41 which slidably engage these straps 40 to prevent rotation of the bar and keep the plow from swinging. To lock the shaft 30, and with it the bar 28 and plow 26, against transverse movement the lever 37 is provided with a pair of lateral lugs 37' in which are removably carried a pair of pins 43 which are adapted to project over the adjacent strap 40 in close contact therewith, to prevent swinging movement of the lever, it being apparent that with both pawls engaging their ratchet wheels and the lever 37 held against swinging the shaft 30 will be held immovable.

It is believed that the manner of use of my improved agricultural implement will be readily understood from the above description. It will be apparent that the plow 26 can be adjusted laterally to different positions as desired.

Having thus described my invention what I claim as new and desire to protect by Letters Patent of the United States is as follows:—

1. In an agricultural implement, a plow, a longitudinal bar on which said plow is fixed, a shaft passing freely through said bar from end to end thereof, gear pinions on the ends of said shaft, transverse racks upon which said gear pinions rest, transverse guide elements adjacent said racks, oppositely extending lugs on the said bar adapted to engage said guide elements, a pair of oppositely facing ratchet wheels on said shaft, and a lever loosely fulcrumed on said shaft and having a pair of pawls mounted thereon to engage the said ratchet wheels.

2. In an agricultural implement, a plow, a longitudinal bar on which said plow is fixed, a shaft passing freely through said bar from end to end thereof, gear pinions on the ends of said shaft, transverse racks upon which said gear pinions rest, transverse guide elements adjacent said racks, oppositely extending lugs on the said bar adapted to engage said guide elements, a pair of oppositely facing ratchet wheels on said shaft, and a lever loosely fulcrumed on said shaft and having a pair of pawls mounted thereon to engage the said ratchet wheels, and means adapted to engage one of said guide elements to lock said lever against rotation.

3. In an agricultural implement, a pair of plows, one of said plows being transversely adjustable, a longitudinal bar on which said last plow is fixed, a shaft passing freely through said bar from end to end thereof, gear pinions on the ends of said shaft, a pair of oppositely facing ratchet wheels on said shaft, and a lever loosely fulcrumed on said shaft and having a pair of pawls mounted thereon to engage the said ratchet wheels, and means for locking said lever against rotation, said means including a pair of pins carried on opposite sides thereof and adapted to engage a fixed part.

In testimony whereof I have affixed my signature.

STEPHEN SZUCS.